United States Patent
Poulis et al.

(10) Patent No.: US 6,654,461 B1
(45) Date of Patent: Nov. 25, 2003

(54) SYNTHESIZED TELEPHONE LINE RING SIGNAL IMPEDANCE TERMINATION

(75) Inventors: Spiro Poulis, Kearns, UT (US); John Evans, Riverton, UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/395,633

(22) Filed: Sep. 14, 1999

(51) Int. Cl.[7] .......................... H04M 7/04; H04M 9/00; H04M 11/00
(52) U.S. Cl. .................... 379/398; 379/93.05; 379/377; 379/387.01; 379/394
(58) Field of Search .......................... 379/92.01, 93.05, 379/93.06, 93.09, 93.29, 93.31, 93.32, 413.01, 442, 443, 372, 377, 387.01, 387.02, 390.03, 394, 395, 398, 399.01, 401; 375/222, 241, 242, 340

(56) References Cited

U.S. PATENT DOCUMENTS

| | | |
|---|---|---|
| 4,395,590 A | 7/1983 | Pierce et al. |
| 5,181,240 A | 1/1993 | Sakuragi et al. |
| 5,528,131 A | 6/1996 | Marty et al. |
| 5,790,656 A | 8/1998 | Rahamin et al. |
| 5,809,068 A | 9/1998 | Johnson |
| 5,815,567 A | 9/1998 | Davis et al. |
| 5,960,072 A * | 9/1999 | Hird et al. .................. 379/132 |
| 6,091,806 A * | 7/2000 | Rasmus et al. .......... 379/93.29 |

* cited by examiner

*Primary Examiner*—Binh Tieu
(74) *Attorney, Agent, or Firm*—Workman Nydegger

(57) ABSTRACT

Provided is a circuit for terminating a ring signal of a telephone network. A physical impedance is combined with a synthesized impedance to produce an impedance having a magnitude substantially equal to the ring termination impedance of a telephone network. The synthesized impedance is created by generating a current from a voltage controlled current source. By controlling the magnitude of the generated current, the magnitude of the synthesized impedance is also controlled. Because the specified ring termination impedances are known, a satisfactory impedance can be synthesized which results in the ring signal being properly terminated.

19 Claims, 4 Drawing Sheets

SYNTHESIZED TELEPHONE LINE RING SIGNAL IMPEDANCE TERMINATION

BACKGROUND OF THE INVENTION

1. Field of the Invention

The present invention relates to circuitry for terminating electrical signals. More specifically, the present invention relates to circuitry for terminating a ring signal of a telephone network.

2. Present State of the Art

From its inception, the design of telephones and telephone networks focused on transmitting the human voice, which generates frequencies that are generally less than 20 kHz. Accordingly, the telephone network was designed to function with these frequencies in mind. These frequencies proved to be limiting factors, however, with regard to newer technologies. Modems, for instance, can be designed to transfer data at extremely high rates, but they are effectively limited to the much lower frequencies that the telephone system can handle. Data transfer speeds can be increased using compression techniques, but in a general sense, the speed at which data can be communicated across a telephone line by a modem is limited by the technology of the telephone network.

As the telephone system continued to develop, standards were created which dictated the requirements to be met by devices connecting to the telephone network. For instance, the telephone company places a direct current voltage of approximately −48 volts on the telephone line, but requires that the connecting device draw little or no current when the device is not being used. This requirement is met by designing the device to present a large load to the telephone system. When these and other specifications are satisfied, the connecting device functions properly and problems such as signal reflection can be avoided.

In addition to transferring voice data, telephone networks use a ring signal to notify a telephone or other device that they have an incoming communication. The circuitry which recognizes and terminates the ring signal is designed to meet certain specifications. Because the receiving device is still on hook when the ring signal is received, the circuitry first detects the ring signal. The ring signal also has a lower frequency than voice signals and the receiving device should be able to properly terminate the ring signal. Third, once the receiving device recognizes the ring signal and goes off hook, the circuitry which terminates the ring signal should not interfere with the voice or data transmissions.

These requirements can be met for a particular telephone network, but designing a telephone or other device that meets the ring termination impedance requirements for a number of different telephone networks is a difficult task for several reasons. There are many different telephone networks in the world and many of them specify a different ring termination impedance. This immediately presents a problem because a telephone or other device with a single physical ring termination impedance that is designed for a particular telephone network, creates signal reflections and other problems when the device connects with other telephone networks.

The inability to accurately match the ring termination impedance of more than one network can be solved by inserting multiple ring termination impedances and using electronic switches or relays to connect the device to the appropriate ring termination impedance. The obvious disadvantage of this method is the cost of the necessary parts and the cost of the manufacturing process. Additionally, modems and other devices embodied on PCMCIA compliant cards have limited surface area. Physically placing the necessary switches, relays and impedances on the printed circuit board of a PCMCIA card may substantially reduce the surface area available for other card components and may prohibitively increase the cost of the card. It is desirable to have circuitry that can match the ring termination impedances of different telephone networks in a less expensive and more efficient manner.

Thus, it would be an advance in the art to provide a low cost and easily configurable method and circuit for appropriately terminating a ring signal in accordance with specifications of a specific telephone network.

OBJECTS AND SUMMARY OF THE INVENTION

It is an object of one embodiment of the present invention to substantially match the ring termination impedance specified by a telephone network.

It is another object of one embodiment of the present invention to synthesize an impedance which effectively terminates a ring signal.

It is yet another object of one embodiment of the present invention to effectively match the ring termination impedances of one or more telephone networks.

It is a further object of one embodiment of the present invention to reduce the circuit components necessary to effectively match the ring termination impedances of one or more telephone networks.

It is another object of one embodiment of the present invention to combine a synthesized impedance with a device impedance in order to match a ring termination impedance.

It is yet another object of one embodiment of the present invention to not draw direct current from the telephone network.

In summary, the basic problem solved by the present invention is being able to effectively match the ring termination impedances of the ring signals specified by telephone networks. One embodiment of the present invention eliminates the need to have a plurality of physical impedances which are connected to the telephone network using relays and switches. Instead, a terminating impedance is synthesized. The synthesized impedance is connected in a parallel configuration to the physical device impedance. The parallel configuration of the device impedance and the synthesized impedance substantially matches the specified ring termination impedance.

The synthesized impedance is created by measuring the line voltage of the telephone line and generating a current. The line voltage divided by the generated current equals the synthesized impedance. In order to synthesize an impedance that will produce the ring termination impedance when combined with the device impedance, the magnitude of the current is controlled. In this manner the synthesized impedance can alter the device impedance such that the ring termination impedance of one or more telephone networks may be effectively matched.

Additional objects and advantages of the present invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Devices that connect or interface with a telephone network are typically designed to meet the specifications of the telephone network to which they will be connecting. The design of a telephone or other device is complicated by the fact that differences exist between the specifications of telephone networks. This presents a problem with regard to the requirement of properly terminating the electrical signals which may be present on the telephone network.

For instance, most telephone networks use a ring signal to indicate to a receiving device that there is an incoming communication. The impedance necessary to properly terminate the ring signal varies from network to network and as described previously, it is expensive and inefficient to physically place both the actual ring termination impedances and the switches and relays necessary to connect those impedances to the ring signal on each device. In applications having limited surface area such as PCMCIA compliant modem cards, the problem becomes more difficult and complicated.

The present invention alleviates these problems and has several advantages. In one embodiment, a single circuit can be used to terminate the ring signals of more than one telephone network, and in PCMCIA compliant applications, the increase in required surface area is minimal. The manufacturing costs of the circuit are reduced as compared to manufacturing a separate impedance for each separate telephone network. Also, the present invention does not draw direct current from the telephone network or central office.

Figure 1:
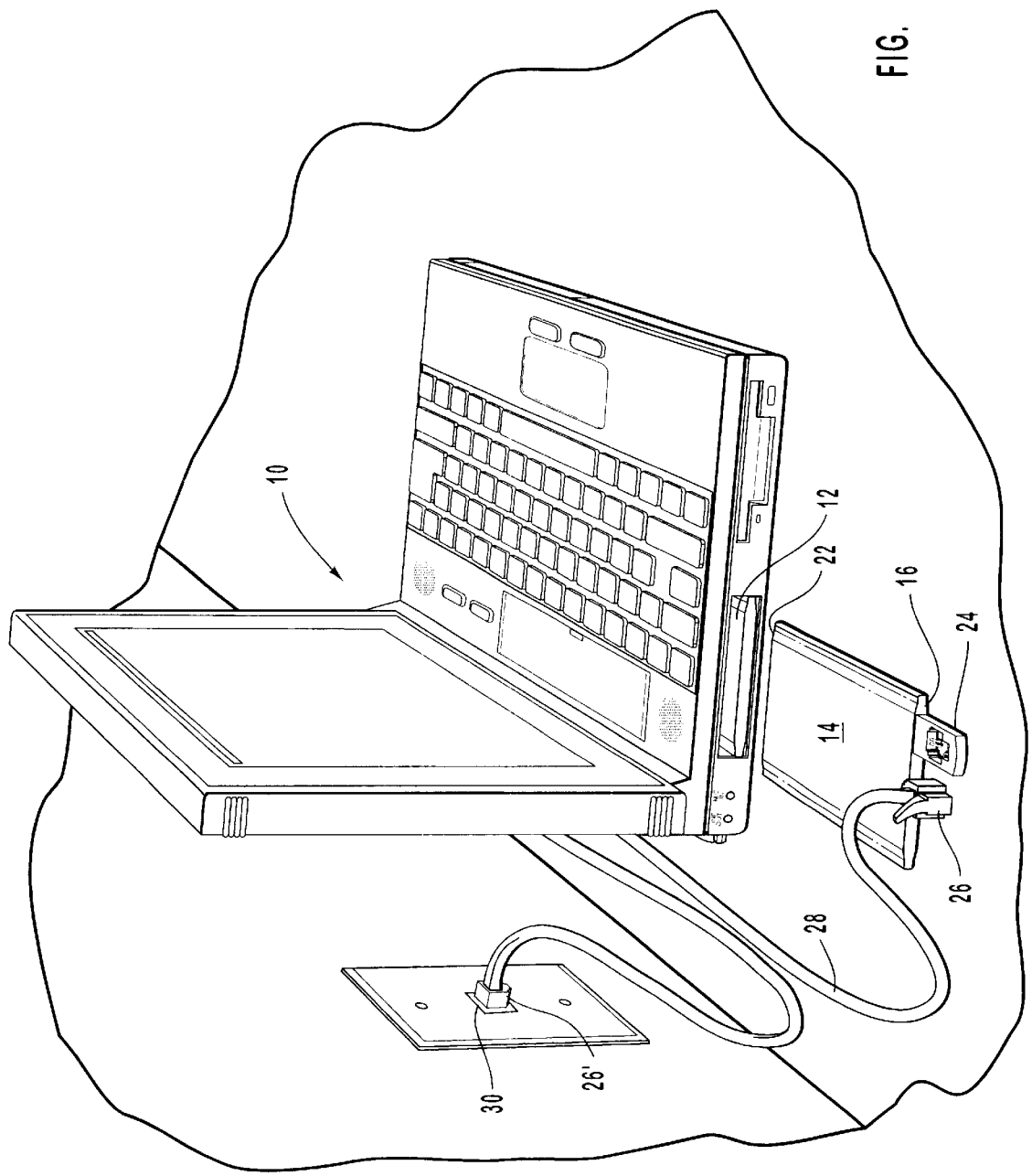
FIG. 1 is an illustration of a system utilizing one embodiment of the present invention.

Illustrated in FIG. 1 is an exemplary system or environment in which the present invention may be utilized or implemented. FIG. 1 is intended to be illustrative of potential systems and is not to be construed as limiting, as other systems may also utilize the present invention. That is to say that will the illustrative embodiment depicts a PCMCA standard, other form factors, both small and large, may integrate the present invention as well as systems that are not constrained by form factors but may also benefit from a synthesized termination. The system of FIG. 1 comprises a portable computer 10 having a PCMCIA compliant slot 12 which is configured to receive PCMCIA compliant card 14. Card 14 may be a modem for connecting to a public telephone network, a network interface card for connecting with an ethernet or other computer network, or any other card. Interface 22 of card 14 is configured to detachably connect with a connector (not shown) inside slot 12. In this manner, card 14 is electrically connected to computer 10.

Card 14 also comprises connector 24, which is illustrated as an RJ type connector, but may be of any type including but not limited to a 15-pin connector or a coaxial cable connector. Connector 24 is configured to removably receive cable 28 and plug 26 assembly by having plug 26 removably inserted in connector 24. The other end of cable 28 comprises plug 26', which is configured to detachably connect with jack 30. Jack 30 is typically connected to a telephone network, or a private branch exchange (PBX) system, or any type of computer network. In this manner, computer 10 and more specifically, card 14 is capable of communication with the network to which jack 30 connects. Jack 30 may be viewed as providing access to a system.

Figure 2:
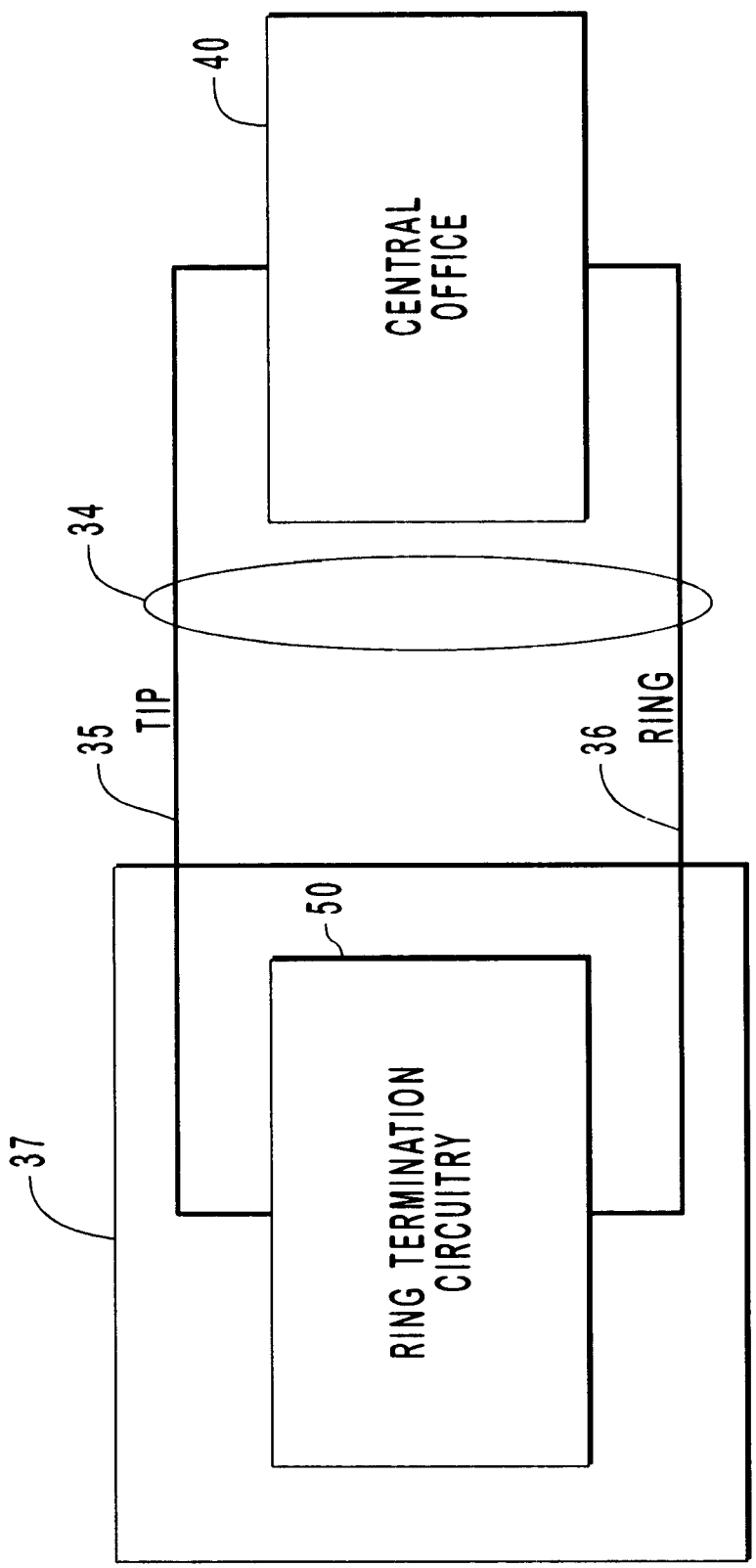
FIG. 2 is a block diagram illustrating the connection between a central office and ring signal termination circuitry.

FIG. 2 is a block diagram illustrating central office 40 and ring termination circuitry 50. Central office 40 is representative of a telephone network or part of a telephone network. Central office 40 provides interconnect paths shown as telephone line 34, which comprises in this embodiment, tip 35 and ring 36. Tip 35 and ring 36 are a wire pair which is used to carry the electric signals utilized by the central office 40. In addition to providing tip 35 and ring 36, central office 40 operates in a variety of states which correspond to various stages of a communication which may occur over telephone line 34. The communication can be initiated and received by any device having the capability to connect with a telephone network.

Telephone line 34 can be electrically connected to a variety of devices including modem 37 as illustrated, a telephone, or other device. Modem 37 is illustrated in FIG. 2 and used to describe the present invention, but it is understood that any other device, including a telephone and a facsimile machine, could also be used. The first state or stage of communication with such a modem or other device may be referred to as an idle state or an "on hook" state. In the on hook state, central office 40 usually applies a direct current (DC) voltage having a magnitude of approximately −48 Volts to ring 36 of telephone line 34. In this state, modem 37 is typically designed to have a large resistance, on the order of 10 Megohms in some embodiments, which is intended to simulate an open circuit. Central office 40 also requires that modem 37 draw little or no current in the on hook state.

The dial stage begins when modem 37 is taken "off hook," at which point central office 40 provides a dial tone to modem 37. The dial tone has a DC voltage level ranging, in some instances, between −43 and −79 Volts, which is typically applied to ring 36 of telephone line 34. A number is dialed and once a connection has been made with another modem or other device, the communication stage begins. In the communication stage, the DC voltages present in the dial stage are still present. However, the polarity of the DC voltage may be reversed in the communication stage. Also, audio signals are superimposed on the DC signal and are representative of the human voice or of the data sent and received by modems or other devices.

Another important stage is the ring stage, which occurs when a device is attempting to establish a communication session with a receiving device. As illustrated, the receiving device is modem 37 and the initiating device may be another modem or a telephone or other device. During the ring stage, central office 40 provides a ring signal in addition to the usual DC bias voltage which is already present on telephone line 34. The ring signal typically has a low frequency, which is approximately 20 Hz in one embodiment, and has a magnitude which can vary, in one embodiment, from 14 to 130 Volts rms. Once the ring signal has been detected, a holding current flows to modem 37. When central office 40 senses that the holding current is flowing, central office 40 ceases to generate and send the ring signal.

While the ring signal is being generated and transmitted, modem 37 terminates the ring signal with ring termination circuitry 50, as illustrated in FIG. 2. In order to comply with the specifications of central office 40, ring termination circuitry 50 has several characteristics, one of which is a termination impedance. The impedance presented by ring termination circuitry 50 preferably terminates the ring signal such that unwanted effects such as signal reflection are reduced or eliminated. But as described previously, the prescribed ring signal termination impedance for a ring signal varies from network to network.

Figure 3:
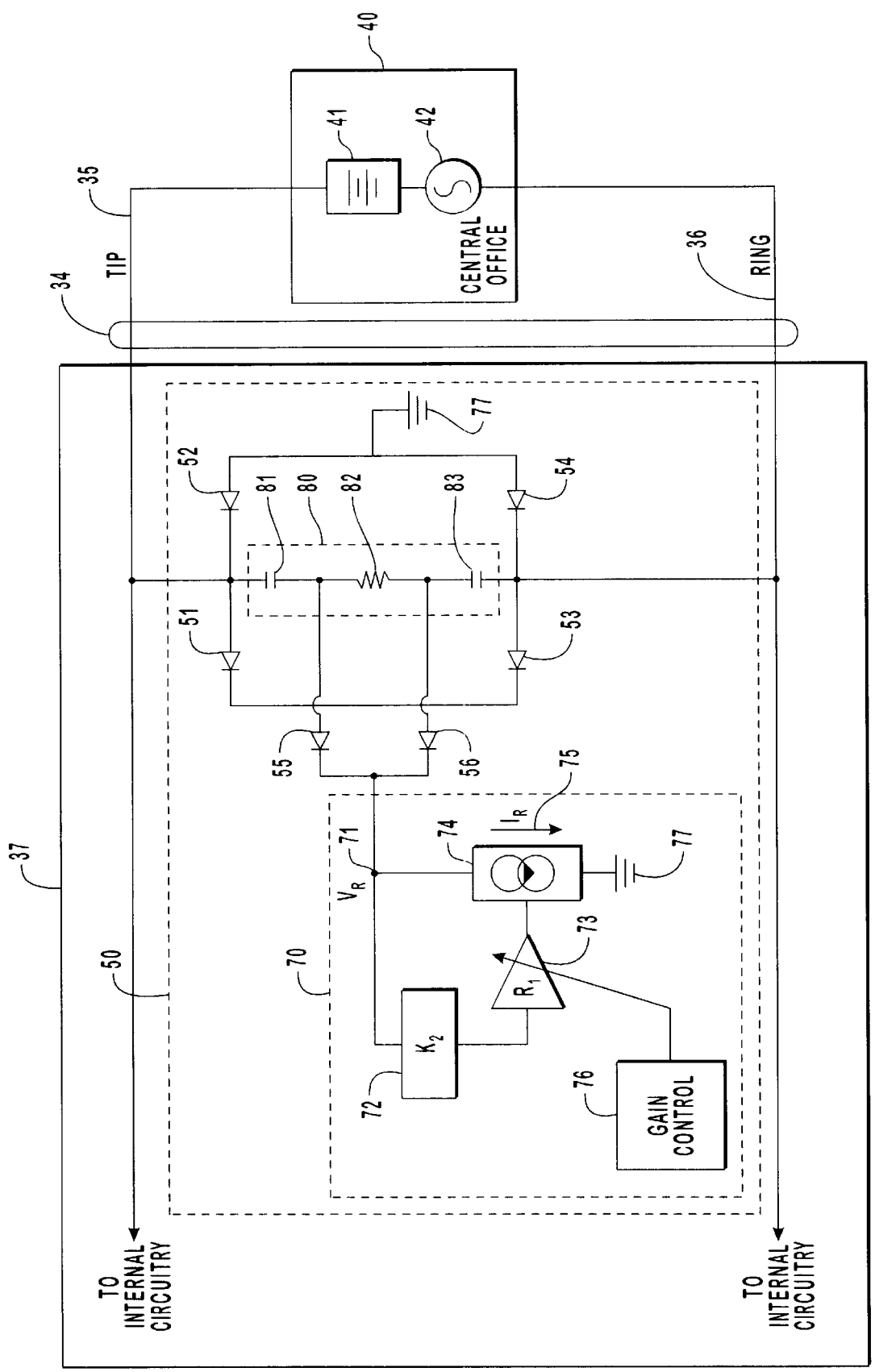
FIG. 3 is an schematic drawing of one embodiment of the circuitry for terminating the ring signals of one or more telephone networks.

In FIG. 3, central office 40 comprises a battery 41 and a ring generator 42. As described previously, battery 41 provides a DC bias over telephone line 34 and ring generator 42 generates a ring signal that is superimposed upon the DC bias. Because modem 37 is initially in an "on hook" state, it is viewed by central office 40 as a large resistance or an open circuit. The ring signal generated by ring generator 42 is transmitted to modem 37 over telephone line 34.

Ring termination circuitry 50 terminates the ring signal generated by ring generator 42 and comprises device impedance 80 which is physically connected to modem 37. Device impedance 80 is connected across tip 35 and ring 36 and comprises capacitor 81, resistor 82, and capacitor 83 in series. Ring termination circuitry 50 also comprises impedance synthesizer circuitry 70 which is capable of modifying device impedance 80 by generating a current which has the effect of placing a synthesized resistance or a synthesized impedance in a parallel configuration with device impedance 80. By controlling the generated current of impedance synthesizer circuitry 70, device impedance 80 can be effectively altered to substantially match the ring termination impedance specified by central office 40.

In practice, the ring termination impedance of most telephone networks can be matched solely by altering the resistive element of device impedance 80. In other words, by choosing a sufficiently large capacitance, the desired ring termination impedance can be created by synthesizing a resistance which is in a parallel configuration with device impedance 80. Capacitor 81 and capacitor 83 are chosen accordingly. In a preferred embodiment, capacitors 81, 83 and resistor 82 are chosen such that the largest ring termination impedance may be accommodated, because the synthesized impedance, which is in a parallel configuration with device impedance 80, effectively lowers the magnitude of device impedance 80.

The impedance or resistance necessary to create an acceptable ring termination impedance is synthesized by impedance synthesizer circuitry 70, which comprises a current source 74, attenuator 72 and amplifier 73. Attenuator 72 attenuates line voltage Vr 71, in one embodiment, by a fixed factor to produce an attenuated voltage that will function with integrated circuitry and microelectronic circuitry. A preferred attenuated voltage is on the order of 5 volts. The line voltage 71 is also present across tip 35 and ring 36. For purposes of simplicity, the voltage drop across diode 55 or diode 56 is ignored. Amplifier 73 receives the attenuated voltage and amplifies it to produce an amplifier voltage or control voltage. Amplifier 73 is connected to current source 74 and the control voltage produced by amplifier 73 regulates or governs the amount of current Ir 75 generated by current source 74.

Gain control 76 controls the gain of amplifier 73 and is programmable such that impedance synthesized by impedance synthesizer circuitry 70 can be adjusted to account for the ring termination impedances of different telephone networks. In other words, the magnitude of the control voltage is governed by gain control 76. In one embodiment, gain control 76 is implemented in software and can be programmed to account for the ring termination impedances of different telephone networks. Attenuator 72, amplifier 73 and gain control 76 are an example of means for generating a control voltage.

In another embodiment, attenuator 72 is implemented as a digital signal processor which receives the analog line voltage Vr 71 and converts it to a digital equivalent with an analog to digital converter. Next, attenuator 72, functioning as a digital signal processor, processes the digital voltage using a procedure that is related to the ring impedance of the telephone network connected to modem 37. This procedure is typically implemented in software and can be altered to adapt to different telephone networks. In this embodiment, amplifier 73 is representative of a digital to analog converter which would convert the output of the digital signal processor to an analog control voltage which would control current source 74. The digital signal processor and the digital to analog converter are another example of means for generating a control voltage.

In either embodiment, the analog voltage Vr 71 divided by the generated current Ir 74 effectively produces an impedance, which, when combined with device impedance 80, substantially terminates the ring signal generated by central office 40. The value or magnitude of current Ir 75 is related to the ring termination impedance of the telephone network and is capable of being altered such that the combination of the synthesized impedance and the device impedance 80 substantially matches the ring termination impedance. Impedance synthesizer circuitry 70 is therefore representative of a generated or synthesized resistance or impedance.

The ring termination impedances of various telephone networks are known quantities and the digital signal processor or gain control 76 can be programmed such that the control voltage produced by either amplifier 73 or the digital to analog converter cause current source 74 to produce current Ir 75. In this manner impedance synthesizer circuitry 70 produces a synthesized impedance having a value equal to line voltage Vr 71 divided by current Ir 75. The addition of a synthesized impedance to device impedance 80 causes ring termination circuitry 50 to create an impedance which substantially matches the specified ring termination impedance.

The impedance required to effectively terminate a ring signal can be represented as a single capacitor in series with a resistor. One of the requirements of a telephone system is that the DC bias provided by central office 40 not be affected by the circuitry terminating the ring signal. For that reason, the required capacitance is illustrated in FIG. 3 as capacitor 81 and capacitor 83 across tip 35 and ring 46. Capacitors 81 and 83 prevent the DC bias provided by battery 41 from being affected by impedance synthesizer circuitry 70. Capacitor 81 and capacitor 83 also insure that there is no direct current path to central office 40 when modem 37 is on hook.

In fact, many telephone networks require that no direct current be pushed or pulled from telephone line 34. Impedance synthesizer circuitry 70, however, requires power to generate current Ir 75. Because impedance synthesizer circuitry 70 is AC coupled to telephone line 34, the requisite power is provided by the ring signal generated by central office 40.

Figure 5:
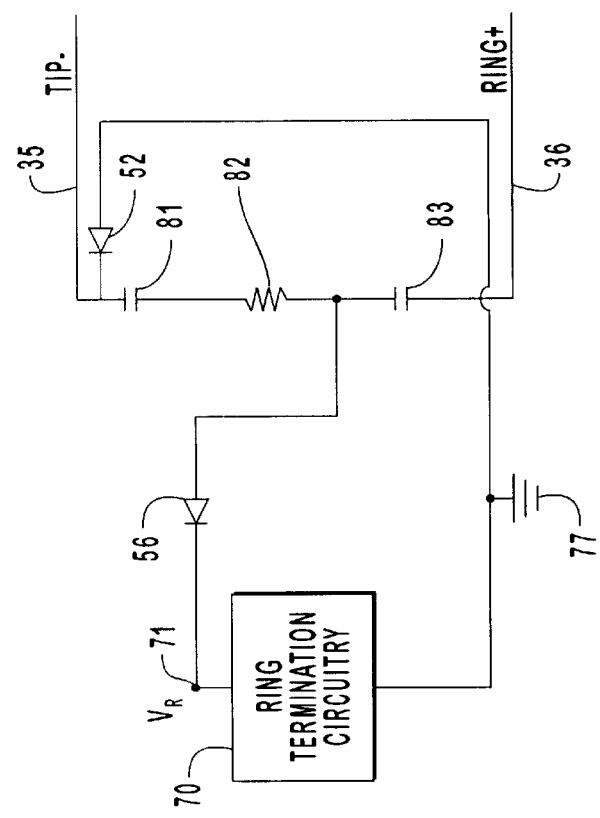
FIG. 5 is an illustration of the path of the ring signal when the ring line is positive with respect to the tip line.
Figure 4:
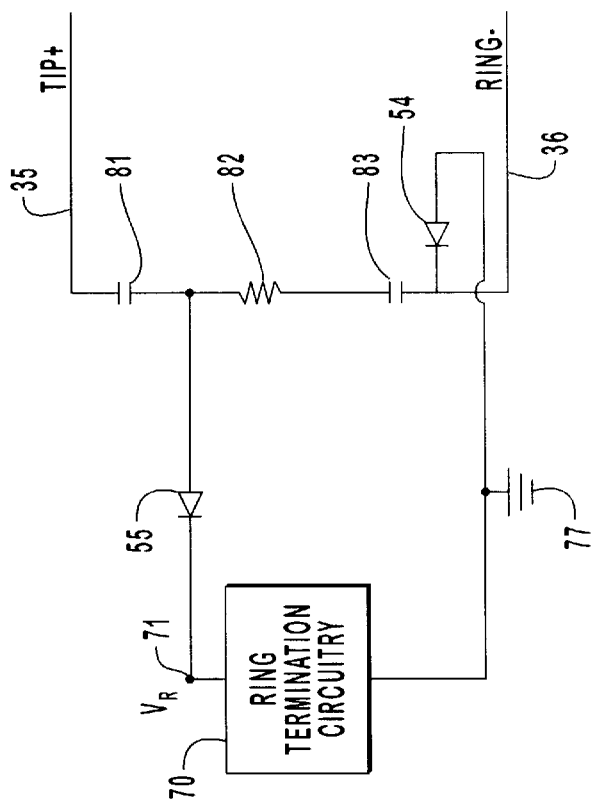
FIG. 4 is an illustration of the path of the ring signal when the tip line is positive with respect to the ring line.

FIG. 4 is an illustration of the path of the ring signal when tip 35 is positive with respect to ring 36 and FIG. 5 is an illustration of the path of the ring signal when ring 36 is positive with respect to tip 35. In both cases, the polarity of the ring signal on tip 35 and ring 36 does not affect the operation of impedance synthesizer circuitry 70. As illustrated in FIG. 4, ring termination circuitry 70 is in parallel with resistor 82 and capacitor 83 when tip 35 is positive with respect to ring 36. FIG. 5 depicts ring termination circuitry 70 in parallel with resistor 82 and capacitor 81 when ring 36 is positive with respect to tip 35. For this reason, ring termination circuitry 70 is in a parallel configuration with device impedance 80 and the parallel configuration effectively lowers the resistive component of device impedance 80. The ring termination impedance of most telephone networks can be created by changing the value of the impedance generated by ring termination circuitry 70 as described above.

FIG. 3 also illustrates a bridge configuration which comprises diodes 51, 52, 53, and 54. The bridge configuration is connected across device impedance 80 and has a bridge ground 77, which is used as a reference. The bridge circuit forms part of the path of the ring signal as illustrated in FIGS. 4 and 5. When tip 35 is positive with respect to ring 36, the ring signal passes through diode 54. When ring 36 is positive with respect to tip 35, the ring signal passes through diode 52.

Impedance synthesizer circuitry 70, as illustrated in FIGS. 3, 4 and 5 has additional advantages. First, the polarity of the ring signal across tip 35 and ring 36 does not significantly affect ring termination circuitry 70 because the polarity of the signal across ring termination circuitry 70 does not reverse or change. In other words, voltage Vr 71 is always positive with respect to bridge ground 77 because of diodes 55 and 56.

Another advantage of impedance synthesizer circuitry 70 is that the circuit does not affect the data transmission of modem 37 once a connection has been established and the ring signal is no longer being sent. The AC impedance of modem 37 in the communication stage is approximately 600 ohms and the AC impedance of impedance synthesizer circuitry 70 and device impedance 80 is on the order of 10–20 kOhms. For that reason, the data transmission of modem 37 is unaffected by the ring termination impedance of modem 37.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A circuit for terminating a ring signal generated by a telephone network, wherein the ring signal is transmitted by the telephone network over a telephone line having at least one wire pair, the circuit comprising:

an impedance capable of being connected across the at least one wire pair; and an impedance synthesizer circuit operably connected in a parallel configuration with the impedance, wherein the impedance synthesizer circuit generates a synthesized impedance such that the ring signal is terminated by the combination of the impedance and the synthesized impedance, the impedance synthesizer circuit comprising:

an attenuator operably coupled to receive a line voltage from the at least one wire pair and produce an attenuated voltage;

an amplifier operably coupled to receive the attenuated voltage and produce an amplifier voltage;

a gain control operably connected to the amplifier to govern a magnitude of the amplifier voltage; and a current source operably connected to the amplifier to produce a current controlled by the amplifier voltage.

2. A circuit as defined in claim 1, wherein the gain control is implemented in software.

3. A circuit as defined in claim 1, wherein the impedance synthesizer circuit is electrically isolated from a direct current of the telephone network.

4. A circuit for terminating a ring signal generated by a telephone network, wherein the ring signal is transmitted by the telephone network over a telephone line having at least one wire pair, the circuit comprising:

an impedance capable of being connected across the at least one wire pair, wherein the impedance comprises a first capacitor, a resistor, and a second capacitor in series; and an impedance synthesizer circuit operably connected in a parallel configuration with the impedance, wherein the impedance synthesizer circuit generates a synthesized impedance such that the ring signal is terminated by the combination of the impedance and the synthesized impedance.

5. A circuit as defined in claim 4, wherein the impedance synthesizer circuit is in parallel with one of the first capacitor and the resistor and the second capacitor and the resistor as dictated by a polarity of the line voltage.

6. A circuit as defined in claim 4, wherein the impedance synthesizer circuit receives power from the ring signal.

7. A device capable of connecting to a telephone network in a circuit for substantially matching a ring signal impedance specified by the telephone network having at least one wire pair the circuit comprising:

a device impedance physically attached to the device and capable of being connected across the at least one wire pair;

an impedance synthesizer circuit operably connected to the device impedance comprising:

an attenuator operably coupled to receive a line voltage from the at least one wire pair and produce an attenuated voltage;

an amplifier operably coupled to receive the attenuated voltage and produce a control voltage;

a current source operably connected to the amplifier, wherein the current source produces a current related to the control voltage, whereby the impedance synthesizer circuit generates a synthesized impedance in a parallel configuration with the device impedance such that the ring signal impedance is matched.

8. A circuit as defined in claim 7, wherein the device impedance comprises a first capacitor, a resistor, and a second capacitor in series.

9. A circuit as defined in claim 8, wherein the impedance synthesizer circuit connects to the device impedance with a first diode and a second diode, wherein the first diode is electrically connected to the device impedance between the first capacitor and the resistor and the second diode is electrically connected to the device impedance between the resistor and the second capacitor.

10. A circuit as defined in claim 7, wherein the impedance synthesizer circuit is isolated from the direct current present on the at least one wire pair.

11. A circuit as defined in claim 7, wherein a gain of the amplifier is controlled by a gain control.

12. A circuit as defined in claim 11, wherein the gain control is implemented in software.

13. In a device, a circuit for terminating a ring signal transmitted by a telephone network having a ring termination impedance over a telephone line having at least a tip and a ring, the circuit comprising:

a device impedance capable of being connected across the tip and the ring, wherein the device impedance comprises a first capacitor, a resistor, and a second capacitor in series;

an impedance synthesizer circuit connected to the device impedance, the impedance synthesizer circuit comprising:

a digital signal processor which receives a line voltage from the tip or the ring and produces an output voltage related to the ring signal termination impedance;

a digital to analog converter which receives the output voltage and produces a control voltage; and a current source connected to the amplifier, wherein the current source produces a current related to the control voltage such that the impedance synthesizer circuit generates a synthesized impedance in a parallel configuration with the device impedance, whereby that the ring signal impedance is matched by the combination of the synthesized impedance and the device impedance.

14. A circuit as defined in claim 13, wherein the impedance synthesizer circuit connects to the device impedance with a first diode and a second diode, wherein the first diode is electrically connected to the device impedance between the first capacitor and the resistor and the second diode is electrically connected to the device impedance between the resistor and the second capacitor.

15. In a device having a device impedance capable of being connected to at least one wire pair of a telephone line transmitting a ring signal, a circuit for terminating the ring signal by synthesizing an impedance that when combined with the device impedance matches a ring termination impedance, the circuit comprising:

means for generating a control voltage comprising:

an attenuator which receives a line voltage present on the at least one wire pair and produces an attenuator voltage; and an amplifier which receives the attenuator voltage and produces the control voltage, wherein a magnitude of the control voltage is governed by a gain control; and a current source connected to the means for generating a control voltage, wherein the current source produces a current having a value related to the ring termination impedance.

16. A circuit as in claim 15, wherein the gain control is implemented in software.

17. A circuit as defined in claim 15, wherein the current source and the means for generating a control voltage are isolated from the direct current of the telephone line.

18. A circuit as defined in claim 15, wherein the current source receives power from the ring signal.

19. A circuit as defined in claim 15, wherein the current source and the means for generating a control voltage are connected to the device impedance via a first diode and a second diode such that the polarity of the live voltage across the current source does not change.

* * * * *